United States Patent [19]

Foster et al.

[11] Patent Number: 4,634,245

[45] Date of Patent: Jan. 6, 1987

[54] CARTRIDGE PLACEMENT HOLDER

[75] Inventors: Dwight R. Foster; Diane Foster, both of Budd Lake, N.J.

[73] Assignee: Life Key Corporation, Budd Lake, N.J.

[21] Appl. No.: 809,487

[22] Filed: Dec. 17, 1985

Related U.S. Application Data

[62] Division of Ser. No. 561,952, Dec. 16, 1983, Pat. No. 4,577,425.

[51] Int. Cl.⁴ .................................... G03B 1/50

[52] U.S. Cl. .................................... 353/95; 253/120

[58] Field of Search ................ 353/95, 120, 121, 122; 40/2 A, 361

[56] References Cited

U.S. PATENT DOCUMENTS 4,390,257 6/1983 Fernekes et al. .................... 353/95

*Primary Examiner*—Harry N. Haroian

*Attorney, Agent, or Firm*—Charles E. Baxley

[57] ABSTRACT

This invention is disclosed to a simulated key that contains important personal and medical information on a microfiche chip (46) enclosed within an information cartridge (32) that is selectively stored within the cover (10) that gives the key its appearance. The information cartridge has a handle (26) with a distinctive aperture (27) and stylized letters (12) to provide a skeleton key appearance yet to clearly disclose to trained medical and emergency personnel the information content of the key. A cartridge placement holder (47) also is provided to align the microfiche chip with the optical and magnification apparatus of conventional microfiche reading apparatus.

2 Claims, 6 Drawing Figures

CARTRIDGE PLACEMENT HOLDER

This is a divisional, of application Ser. No. 561,952 filed Dec. 16, 1983, now U.S. Pat. No. 4,577,425.

TECHNICAL FIELD

This invention is directed to information storage devices and, more particularly, to a key-shaped device that can be assembled and disassembled to store and to make available for examination a data-bearing microfiche chip, and the like.

BACKGROUND ART

The need for each individual to carry at all times some record of identity, personal and medical data, is as old, perhaps, as society. Identification tags that are issued by governments to members of many armed forces (and in some extreme situations, to the public at large) are typically durable items that are carried on the person. These tags usually disclose the name, a personal identification number, blood type, and religious affiliation, if any, of the bearer.

For general public use, less formal and more attractive data storage and presentation devices have enjoyed some limited popularity. Bracelets, for example, to be worn by men or women, that specify certain physical disabilities or allergies of the wearer, e.g., diabetes or penicillin reaction, now are relatively common. There is, however, a continuing core of male market resistance to articles of this nature and a conflict between the need to wear these bracelets all of the time and a perceived feminine practice of frequently changing jewelry to match specific occasions, styles of dress and the like. Both of these reasons for reluctance to wear bracelets are, of course, completely at odds with the requirement that bracelets and other items of this nature should be plainly visible and immediately recognizable to a medical attendant during an emergency.

Bracelets and similar items also fail to satisfy an equally or more important need. The ability to assist a patient is, in many ways, directly related to the availability of a great deal of basic medical information about that person. The effectiveness of emergency care procedures, moreover, may depend on the almost immediate availability of detailed background information about the person and in a degree of detail that is not compatible with a simple bracelet inscription.

There is a further obstacle to the general adoption of a bracelet or similar item of personal wear. This obstacle is the perfectly normal and practical desire of most human beings to avoid exposing the existence of some infirmity or disability to the public at large.

Accordingly, the need to reconcile the requirement to carry on the person a large amount of basic medical and other data in a form that is immediately recognizable as such to medical and emergency workers with the practical, esthetic, and data storage limitations that characterize bracelets and the like remains unsatisfied.

Through the years there have been a number of proposals to store important data on items that are attached to key chains because seldom does anyone leave the confines of the house without a chain of house, automobile and other keys on the person. The following United States patents are typical of these proposals:

U.S. Pat. No. 292,954 granted to J. C. Russel on Feb. 5, 1884 for "Key Tag" shows a device bearing return address and reward information that is to be attached to a key chain.

U.S. Pat. No. 2,928,195 granted to B. T. Fischer on Mar. 15, 1960 for "Combination Key and Picture Holder" shows a key-shaped device with slidable, information bearing inserts attached to a key chain.

U.S. Pat. No. 3,209,479 granted to S. R. Manzardo on Oct. 5, 1965 for "Identification Means for Keys" shows a body attached to a key and a message slip inserted in that body.

U.S. Pat. No. 4,239,261 granted to W. L. Chubb on Sept. 21, 1982 for "Key Attachment" shows an attachment that is secured to a key, the attachment containing information that indicates the specific lock associated with that key.

None of these patents, however, disclose or suggest any means for storing a great volume of detailed information in an inexpensive device that is clearly and immediately recognizable as a data repository.

DISCLOSURE OF THE INVENTION

These and other difficulties that have characterized the prior art are overcome, to a great extent, through the practice of the invention. Illustratively, an hollow, key-shaped device suitable for attachment to a key chain, key ring or the like, has a distinctive physical appearance. The simulated key is disassembled to expose a rod, or information cartridge, that contains a readable microfiche chip. The chip stores the large volume of personal and medical information about the bearer of the simulated key that is required for the effective application of modern medical technique.

Because the simulated key enjoys a distinctive appearance, its purpose is immediately apparent to medical and emergency personnel.

The simulated key that characterizes the invention, however, also satisfies personal privacy and esthetic needs in that it is seldom exposed to public observation for more than a short time and, even when so exposed, is part of a larger mass of conventional keys.

To enable the information on the chip to be read by means of the conventional microfiche reading apparatus that frequently can be found in hospitals, clinics, emergency rooms and the like, a lens carrier cartridge placement holder is provided. This device preferably is a rectangular plate with the dimensions of a standard-size microfiche transparency. A smaller rectangular fitting is secured centrally on the surface of the plate. A passgeway having a cam surface is formed in the fitting to receive the information cartridge and to center the microfiche chip relative to the reader's illumination and magnification apparatus to enable the data on the chip to be displayed on the reader's viewing screen.

The fitting also can be inserted directly into a lens carrier and lamp unit for display on the screen of a smaller magnification and projection device that is more suited to table, wall mounting or installation in an ambulance.

Thus, there is provided in accordance with the invention, a durable, inexpensive apparatus to enable a person to carry vital information at all times in a form that protects the bearer's privacy and esthetic sensibilities while nevertheless clearly disclosing the ready availability of this vital information to trained personnel. These and other features of the invention will be appreciated more completely through a study of the following detailed description of the preferred embodiment of the invention, the scope of the invention, however, being limited only by the claims appended hereto.

BEST MODE OF CARRYING OUT THE INVENTION

Figure 1:
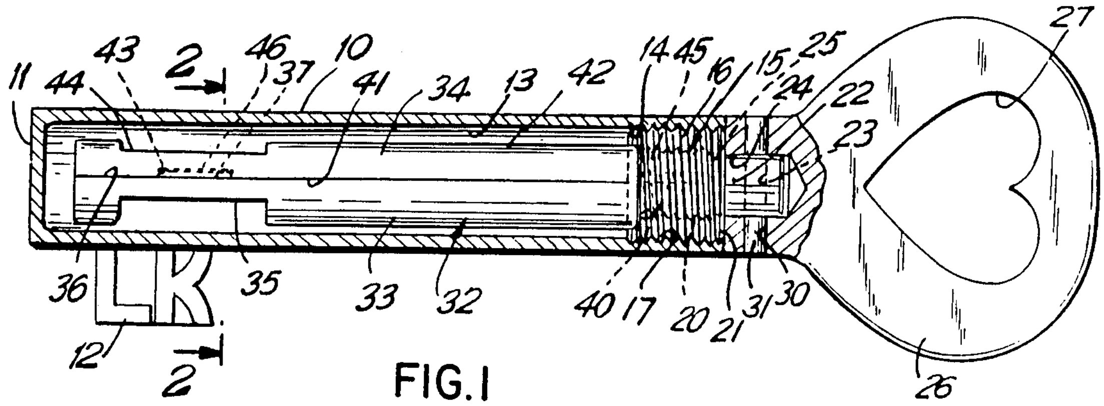
FIG. 1 is a front elevation in broken section of a typical embodiment of the invention.

For a more detailed understanding of the invention, attention is invited to FIG. 1 of the drawing. As illustrated, a hollow, generally cylindrical cartridge cover 10 of metal, durable plastic or other suitable material, is closed at one longitudinal extremity by means of a transverse partition 11. Spaced a short longitudinal distance from the partition, and in accordance with a feature of the invention, a simulated skeleton key profile is established by means of stylized indicia or letters 12 that protrude in a radial direction from the outer surface of the cylindrical cover 10. As shown in this illustrative embodiment of the invention, the stylized letters 12 are "L" and "K", which reflect the term "Life Key" to render the device immediately recognizable as a personal data repository to medical and emergency workers. Naturally, other indicia can be used for this purpose.

The transverse end of the cartridge cover 10 that is opposite to the partition 11 is open. Interior surface 13 of the cartridge cover 10 is provided with internal threading 14 that extends a relatively short distance from the open transverse end of the cover into the cover's interior.

A fastening 15 has external threading 16 that meshes with the internal threading 14 of the cover 10 in order to mount the fastening in the open transverse end of the cover in a manner that will enable the fastening to be inserted and removed therefrom as described subsequently in more complete detail. The fastening 15 also has a centrally disposed longitudinal recess 17 that is concentric with the external threading 16. As illustrated, the recess 17 also is provided with internal threads 20. Exposed transverse end 21 of the fastening 15 has a longitudinally protruding shank 22 that has a transverse, diametrically disposed bore 23.

The shank 22 is received within a longitudinal recess 24 that is found in a tapering end 25 of a generally flat handle 26. As shown in the drawing, the handle 26 has an heart-shaped or visually unique aperture 27 that serves the double purpose of accommodating a key chain or key ring (not shown in the drawing) and, in accordance with a feature of the invention, providing a further means for immediately identifying the device as a repository for important personal data.

In order to provide a neat, finished appearance for the device, it is important to align the flat, apertured portion of the handle 26 with the radially disposed stylized letters 12. Toward this end, the tapered end 25 of the handle 26 has a transverse, radially disposed bore 30 that is aligned with the bore 23 in the shank 22. Both of these bores 23, 30 are formed after the fastening 15 is fully seated in the interior surface 13 of the cover 10 and the radial orientation of the flat portion of the handle 26 is radially aligned with the letters 12. A pin 31 is inserted into the aligned bores 23, 30 to lock the fastening 15 to the handle 26 permanently in the preferred alignment, thereby avoiding an esthetically undesirable misalignment between the handle and the letters 12 that is likely to occur if special care is not taken. There are, of course, a number of other mechanical techniques for securing this desired alignment. The handle 26, after alignment, for example, could be glued to the shank.

Figure 2:
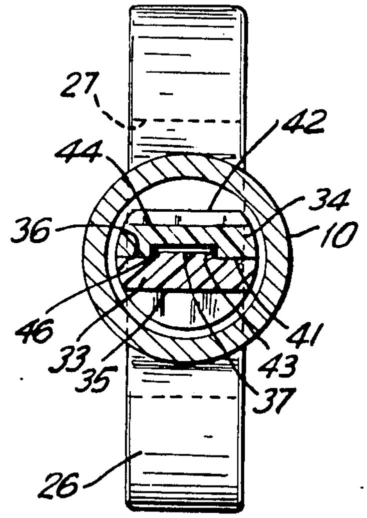
FIG. 2 is a transverse view, in full section of the embodiment of the invention that is shown in FIG. 1, taken along the line 2—2 and viewed in the direction of the arrows.

An additional feature of the invention relates to a transparent information cartridge 32 that is longitudinally disposed within the cartridge cover 10. As illustrated, the cartridge 32 is divided lengthwise along the longitudinal axis of the cover 10 into a male member 33 and a female member 34. As best shown in FIG. 2, the male member 33 has a generally semicircular cross section that is interrupted on its outer, semicircular surface on the end of the information cartridge 32 that is near to the transverse partition 11 only by a flat, longitudinally disposed protective window 35 which will be described subsequently in more complete detail. Flat, diametrical face 36 of the male member is interrupted only by a protruding rectangular supporting surface 37 that is centrally positioned with respect to the protective window 35. The opposite end of the male member terminates in a threaded portion 40.

The flat, diametrical face 36 of the male member bears against a matching face 41 on the female member 34. The outer surface of the female member 34 is generally circular, but also accommodates a flat cam surface 42 that is generally parallel with the matching face 41. Attention is invited, moreover, to a rectangular recess 43 that is formed in the matching face 41 in alignment not only with the protruding supporting surface 37 but also with another rectangular protective window 44 in the outer surface of the female member 34. The opposite end of the female member 34 also terminates in a threaded portion 45.

Thus, when pressed together, the male member 33 and the female member 34 enjoy a complete threading through the combination of the threaded portions 40, 45 that meshes with the internal threads 20 in the fastening 15. The supporting surface 37 also protrudes sufficiently deep into the rectangular recess 43 to provide a small rectangular volume that furnishes space for supporting a microfiche chip 46 on which significant data has been stored.

Figure 3:
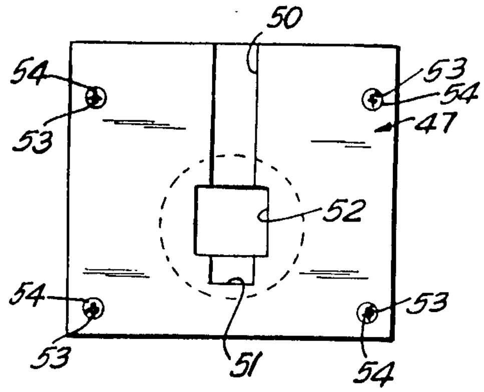
FIG. 3 is a front elevation of a fitting for aligning the microfiche chip in the information cartridge shown in FIGS. 1 and 2 with the optical magnification system of a microfiche reader.

To read the data on the chip 46 with conventional microfiche reading apparatus, attention now is invited to FIG. 3, which shows a generally flat, rectangular cartridge placement holder 47. A bore 50 is formed in the holder 47 that extends from one side of the holder to an alignment stop 51. The bore 50 has a transverse cross section (not shown in the drawing) that matches the semicircular and flat cam face 42 of the information cartridge 32 to assure that the information cartridge always must be inserted into the bore 50 in the correct orientation relative to the microfiche reader illumination and magnification apparatus (not shown in FIG. 3). The alignment stop 51 in the placement holder 47 thus orients the microfiche chip 46 (FIGS. 1 and 2) with a rectangular aperture 52 in the holder. Note also that four threaded and countersunk bores 53 receive corresponding screws 54.

Figure 6:
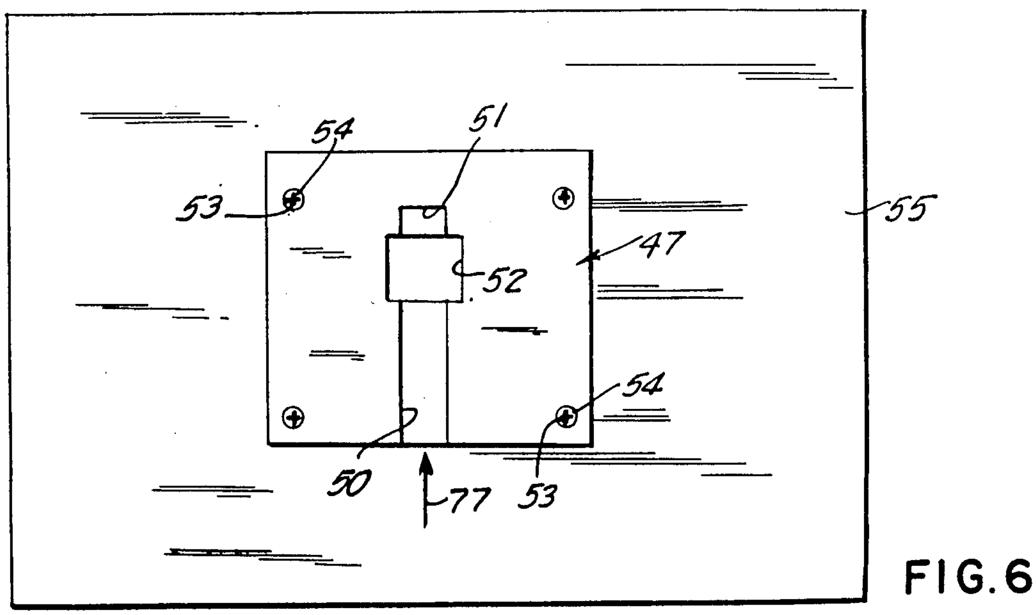
FIG. 6 is an adaptor for aligning a microfiche chip, mounted in an information cartridge in accordance with the invention, with the illumination and magnification system of a microfiche reader.

Turning now to FIG. 6, the cartridge placement holder 47 is attached by means of the screws 54 to the central portion of a rectangular, flat plate 55 that has the same dimensions as a conventional microfiche. Typical microfiche dimensions are 4" by 7⅝" and 4" by 6". In this way the plate 55 with the attached placement holder can be inserted into a typical microfiche reader and align the microchip (FIGS. 1 and 2) in the information cartridge 32 with the optical system of the reading device (not shown in the drawing) in order to swiftly display the information stored on the chip without requiring any special adjustment to either the reading device or the information cartridge.

Figure 4:
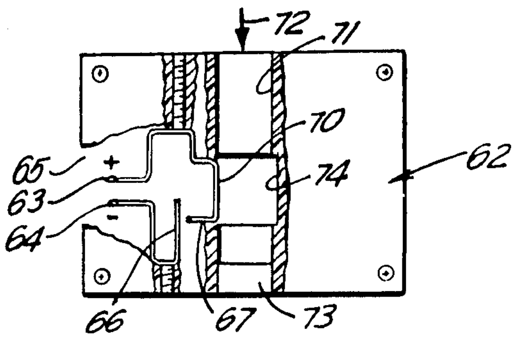
FIG. 4 is a front elevation in full section of an alignment fitting that also incorporates an electrical switch operated by the information cartridge.
Figure 5:
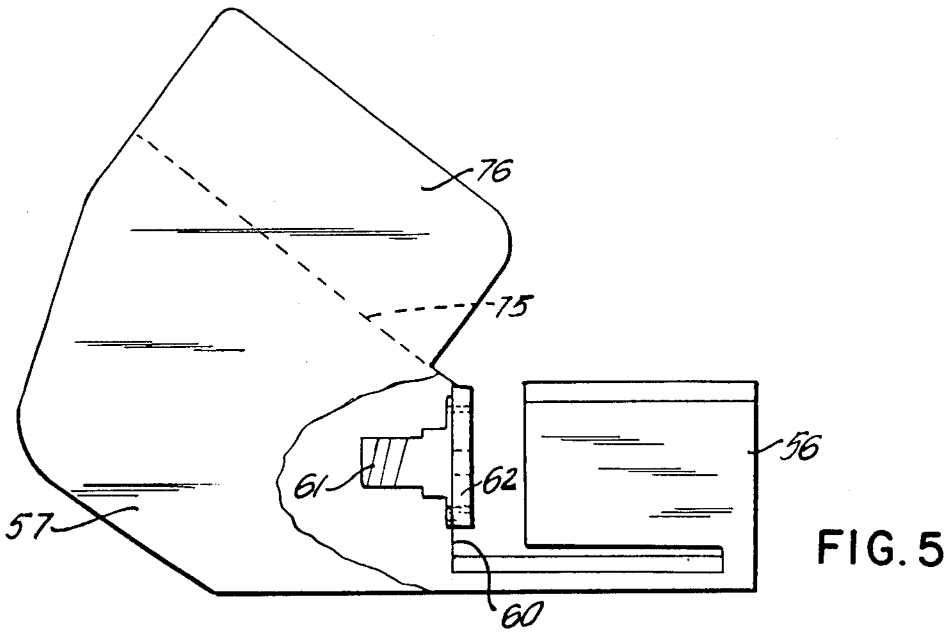
FIG. 5 is a side elevation of a compact reading apparatus for supporting the fitting shown in FIG. 4 in order to display data stored on the microfiche chip.

Attention now is invited to FIG. 5, which shows a small, compact reading device that can be mounted in an ambulance, on a table, or with suitable brackets on a wall. As shown, a lamp unit 56 is in optical alignment with a lens carrier unit 57. The lens carrier unit 57 has a slotted positioning mechanism 60 that supports a threaded lens focusing apparatus 61 to which a cartridge placement holder 62 is attached. The holder 62 best adapted to the unit 57 is shown in FIG. 4.

Thus, a pair of electrical terminals 63, 64 are exposed through an aperture 65 in the side of the holder 62 for connection to the electrical circuit (not shown in the drawing) that energizes the lamp unit 56 (FIG. 5). The terminal 64 is coupled to a spring switch contact 66 that is in alignment with a spring loaded contact 67 which in turn is in circuit with the terminal 63. A protrusion 70 on the spring loaded contact 67 extends into cam-shaped bore 71. Thus, inserting the information cartridge 32 that is shown in FIGS. 1 and 2 into the bore 71 in the direction of arrow 72 enables the free end of the cartridge to bear against an alignment stop 73 that obstructs the opposite end of the bore.

In this manner, the protective windows 35, 44 (FIG. 1) and the microfiche chip 46 sandwiched between these is aligned with an aperture 74 (FIG. 4) in the holder 62 while, at the same time, the surface of the information cartridge 32 that is adjacent to the protrusion 70 on the spring loaded contact 67 presses this contact against the switch contact 66 in order to complete the electrical illumination circuit (not shown) for the lamp unit 56 (FIG. 5) in order to project a magnified image of the microfiche chip data onto a screen 75 for viewing.

To reduce the effect of background illumination on the screen 75, a hood 76 is attached to the periphery of the screen on the reading apparatus.

In operation, the microfiche chip 46 (FIGS. 1 and 2) is prepared and placed in correct optical orientation between the surface of the rectangular recess 43 and the stop 37. Joining together the male and female members 33, 34 enables the threaded portions 40, 45 to be seated in the internal threads 20 of the fastening 15. The external threads 16 of the fastening 15 are meshed with the internal threads 14 found inside the open end of the cartridge cover 10 by grasping the handle 26 between the thumb and index figner, and, with a twisting motion, screwing the fitting 15 and the associated information cartridge 32 into the cover until the fitting is fully seated in the cover. It will be recalled that to provide a neat, workmanlike appearance the handle 26 was radially aligned with the stylized letters 12. The device then can be added to a key ring or key chain.

To change the microfiche chip 46 in order to add or delete data, or to examine the information on the chip, the handle 26 is grasped firmly in one hand and, with the other hand, the cartridge cover 10 is unscrewed from the external theading 16 on the fastening 15.

With the cam surface 42 on the information cartridge 32 properly aligned relative to the transverse matching cross section of the bore 50 (FIG. 6) of the cartridge placement holder 47, the cartridge is thrust into the bore 50 in the direction of arrow 77 until the free end of the cartridge bears against the alignment stop 51. In this way the microfiche chip 46 (FIGS. 1 and 2) is in proper optical alignment with the aperture in the holder 47 (FIG. 6). The holder 47 and the flat plate 55 then are placed on the microfiche table (not shown) of a conventional reader. In this way, the microfiche chip 46 (FIGS. 1 and 2) is centered to permit quick focusing and swift readability of the data stored on the chip because of the almost automatic alignment of the chip with the illumination and magnification system of the reading device.

In a similar manner, the holder 62 shown in FIG. 4 also receives a properly oriented information cartridge 32 (FIG. 1) by inserting the cartridge into the holder that is illustrated in FIG. 4 in the direction of the arrow 72. As previously mentioned, the surface of the cartridge closes the electrical circuit through the contacts 66, 67 by pressing the protrusion 70 out of the bore 71. This contact closing function completes the electrical illumination circuit for the lamp unit 56 that is shown in FIG. 5. The microfiche chip (not shown in FIGS. 4 and 5) also is optically aligned with the lamp unit 56 in the reader and the focusing apparatus 61 is adjusted to project the microfiche data on the screen 75.

Removing the information cartridge by withdrawing it from the bore 71 in a direction opposite to the arrow 72 releases the stored energy in the spring loaded contact 67, causing this contact to break electrical continuity with the contact 66 and thus deenergize the lamp unit 56 in FIG. 5.

Turning again to FIG. 1, the information cartridge 32 is returned to its usual position within the cover 10 in the manner described above.

INDUSTRIAL APPLICABILITY

Thus, the invention provides a convenient, durable, inexpensive and immediately identifiable means for supplying detailed personal information about the bearer in a manner, nevertheless, that protects the bearer's privacy and does not offend esthetic sensibilities.

We claim:

1. A cartridge placement holder comprising, a generally rectangular shaped block having two generally parallel flat surfaces, said block having a cam shaped bore formed between said flat surfaces and penetrating past the mid-point of said block to form a cartridge alignment stop, and a transverse aperture spaced from said stop intersecting said bore and penetrating both of flat surfaces, a plate attached to said block, said plate having the dimensions of a microfiche card and said block being disposed centrally thereon with one of said flat faces bearing against said plate.

2. A cartridge placement holder according to claim 1 further comprising a spring switch contact within said block and a spring loaded switch contact within said block, said spring loaded contact having a protrusion obtruding itself into said cam shaped bore.

* * * * *